(12) United States Patent
Bortolin et al.

(10) Patent No.: US 8,775,241 B2
(45) Date of Patent: *Jul. 8, 2014

(54) METHOD AND SYSTEM FOR DETERMINING REWARDS

(71) Applicant: Visa U.S.A. Inc., San Francisco, CA (US)

(72) Inventors: Corinne Bortolin, Half Moon Bay, CA (US); Jean Elizabeth Farnsworth, San Mateo, CA (US); Chris S. Nelson, Foster City, CA (US); James G. Gordon, Foster City, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/851,723

(22) Filed: Mar. 27, 2013

(65) Prior Publication Data

US 2013/0290090 A1     Oct. 31, 2013

Related U.S. Application Data

(63) Continuation of application No. 13/157,251, filed on Jun. 9, 2011, now Pat. No. 8,433,608, which is a continuation of application No. 10/365,711, filed on Feb. 11, 2003, now Pat. No. 8,010,405.

(60) Provisional application No. 60/399,000, filed on Jul. 26, 2002.

(51) Int. Cl.
*G06Q 30/00* (2012.01)
*G06Q 30/02* (2012.01)

(52) U.S. Cl.
CPC .................................. *G06Q 30/02* (2013.01)
USPC ............................................... 705/14.1

(58) Field of Classification Search
CPC ....................................................... G06Q 90/00
USPC ............................................... 705/14.1
See application file for complete search history.

(56) References Cited

U.S. PATENT DOCUMENTS 3,935,933 A    2/1976    Tanaka et al.
4,011,433 A    3/1977    Tateisi et al.

(Continued)

FOREIGN PATENT DOCUMENTS

AU    200039412    12/2000
BE    1002756    5/1991

(Continued)

OTHER PUBLICATIONS

Internet based secure transactions using encrypting applets and cgi-scripts Independent of browser or server capabilities; 1998, IBM Research Disclosure, No. 410116, pp. 800-801.

*Primary Examiner* — Daniel Lastra
(74) *Attorney, Agent, or Firm* — Kilpatrick Townsend Stockton LLP

(57) ABSTRACT

A system for facilitating reward selection and redemption for a loyalty program is disclosed. The system includes a point-of-sale (POS) device that is capable of monitoring and processing a reward redemption. The POS device informs a participant of the loyalty program as to what rewards are available for redemption. The participant is given an opportunity by the POS device to select the desired reward for redemption. Alternatively, the POS device allows the participant to defer redemption of the available rewards.

25 Claims, 15 Drawing Sheets

(56) References Cited

U.S. PATENT DOCUMENTS

| | | |
|---|---|---|
| 4,108,350 A | 8/1978 | Forbes, Jr. |
| 4,124,109 A | 11/1978 | Bissell et al. |
| 4,195,864 A | 4/1980 | Morton et al. |
| 4,412,631 A | 11/1983 | Haker |
| 4,544,590 A | 10/1985 | Egan |
| 4,568,403 A | 2/1986 | Egan |
| 4,674,041 A | 6/1987 | Lemon et al. |
| 4,723,212 A | 2/1988 | Mindrum et al. |
| 4,742,215 A | 5/1988 | Daughters et al. |
| 4,794,530 A | 12/1988 | Yukiura et al. |
| 4,825,053 A | 4/1989 | Caille |
| 4,837,422 A | 6/1989 | Dethloff et al. |
| 4,841,712 A | 6/1989 | Roou |
| 4,868,376 A | 9/1989 | Lessin et al. |
| 4,882,675 A | 11/1989 | Nichtberger et al. |
| 4,910,672 A | 3/1990 | Off et al. |
| 4,930,129 A | 5/1990 | Takahira |
| 4,941,090 A | 7/1990 | McCarthy |
| 4,949,256 A | 8/1990 | Humble |
| 4,954,003 A | 9/1990 | Shea |
| 4,985,615 A | 1/1991 | Iijima |
| 4,992,940 A | 2/1991 | Dworkin |
| 5,019,452 A | 5/1991 | Watanabe et al. |
| 5,019,695 A | 5/1991 | Itako |
| 5,025,372 A | 6/1991 | Burton et al. |
| 5,056,019 A | 10/1991 | Schultz et al. |
| 5,060,793 A | 10/1991 | Hyun et al. |
| 5,060,804 A | 10/1991 | Beales et al. |
| 5,063,596 A | 11/1991 | Dyke |
| 5,115,888 A | 5/1992 | Schneider |
| 5,117,355 A | 5/1992 | McCarthy |
| 5,128,752 A | 7/1992 | Von Kohorn |
| 5,161,256 A | 11/1992 | Iijima |
| 5,173,851 A | 12/1992 | Off et al. |
| 5,185,695 A | 2/1993 | Pruchnicki |
| 5,200,889 A | 4/1993 | Mori |
| 5,202,826 A | 4/1993 | McCarthy |
| 5,227,874 A | 7/1993 | Von Kohorn |
| 5,256,863 A | 10/1993 | Ferguson et al. |
| 5,285,278 A | 2/1994 | Holman |
| 5,287,181 A | 2/1994 | Holman |
| 5,287,268 A | 2/1994 | McCarthy |
| 5,299,834 A | 4/1994 | Kraige |
| 5,308,120 A | 5/1994 | Thompson |
| 5,353,218 A | 10/1994 | De Lapa et al. |
| 5,380,991 A | 1/1995 | Valencia et al. |
| RE34,915 E | 4/1995 | Nichtberger et al. |
| 5,402,549 A | 4/1995 | Forrest |
| 5,417,458 A | 5/1995 | Best et al. |
| 5,420,606 A | 5/1995 | Begum et al. |
| 5,450,938 A | 9/1995 | Rademacher |
| 5,466,010 A | 11/1995 | Spooner |
| 5,471,669 A | 11/1995 | Lidman |
| 5,473,690 A | 12/1995 | Grimonprez et al. |
| 5,483,444 A | 1/1996 | Heintzeman et al. |
| 5,484,998 A | 1/1996 | Bejnar et al. |
| 5,491,326 A | 2/1996 | Marceau et al. |
| 5,491,838 A | 2/1996 | Takahisa et al. |
| 5,500,681 A | 3/1996 | Jones |
| 5,501,491 A | 3/1996 | Thompson |
| 5,513,102 A | 4/1996 | Auriemma |
| 5,515,270 A | 5/1996 | Weinblatt |
| 5,530,232 A | 6/1996 | Taylor |
| 5,531,482 A | 7/1996 | Blank |
| 5,535,118 A | 7/1996 | Chumbley |
| 5,537,314 A | 7/1996 | Kanter |
| 5,559,313 A | 9/1996 | Claus et al. |
| 5,564,073 A | 10/1996 | Takahisa |
| 5,577,266 A | 11/1996 | Takahisa et al. |
| 5,577,915 A | 11/1996 | Feldman |
| 5,578,808 A | 11/1996 | Taylor |
| 5,579,537 A | 11/1996 | Takahisa |
| 5,594,493 A | 1/1997 | Nemirofsky |
| 5,612,868 A | 3/1997 | Off et al. |
| 5,621,812 A | 4/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,649,118 A | 7/1997 | Carlisle et al. |
| 5,650,209 A | 7/1997 | Ramsburg et al. |
| 5,687,322 A | 11/1997 | Deaton et al. |
| 5,689,100 A | 11/1997 | Carrithers et al. |
| 5,710,886 A | 1/1998 | Christensen et al. |
| 5,727,153 A | 3/1998 | Powell |
| 5,734,838 A | 3/1998 | Robinson et al. |
| 5,742,845 A | 4/1998 | Wagner |
| 5,754,762 A | 5/1998 | Kuo et al. |
| 5,761,648 A | 6/1998 | Golden et al. |
| 5,765,141 A | 6/1998 | Spector |
| 5,767,896 A | 6/1998 | Nemirofsky |
| 5,774,870 A | 6/1998 | Storey |
| 5,776,287 A | 7/1998 | Best et al. |
| 5,791,991 A | 8/1998 | Small |
| 5,794,210 A | 8/1998 | Goldhaber et al. |
| 5,797,126 A | 8/1998 | Helbling et al. |
| 5,802,519 A | 9/1998 | De Jong |
| 5,804,806 A | 9/1998 | Haddad et al. |
| 5,806,044 A | 9/1998 | Powell |
| 5,806,045 A | 9/1998 | Biorge et al. |
| 5,815,658 A | 9/1998 | Kuriyama |
| 5,822,735 A | 10/1998 | De Lapa et al. |
| 5,822,737 A | 10/1998 | Ogram |
| 5,832,457 A | 11/1998 | O'Brien et al. |
| 5,844,218 A | 12/1998 | Kawan et al. |
| 5,845,259 A | 12/1998 | West et al. |
| 5,855,007 A | 12/1998 | Jovicic et al. |
| 5,857,175 A | 1/1999 | Day et al. |
| 5,859,419 A | 1/1999 | Wynn |
| RE36,116 E | 2/1999 | McCarthy |
| 5,865,340 A | 2/1999 | Alvern |
| 5,865,470 A | 2/1999 | Thompson |
| 5,868,498 A | 2/1999 | Martin |
| 5,880,769 A | 3/1999 | Nemirofsky et al. |
| 5,884,271 A | 3/1999 | Pitroda |
| 5,884,277 A | 3/1999 | Khosla |
| 5,884,278 A | 3/1999 | Powell |
| 5,887,271 A | 3/1999 | Powell |
| 5,890,135 A | 3/1999 | Powell |
| 5,892,827 A | 4/1999 | Beach et al. |
| 5,898,838 A | 4/1999 | Wagner |
| 5,903,732 A | 5/1999 | Reed et al. |
| 5,905,246 A | 5/1999 | Fajkowski |
| 5,905,908 A | 5/1999 | Wagner |
| 5,907,350 A | 5/1999 | Nemirofsky |
| 5,907,830 A | 5/1999 | Engel et al. |
| 5,909,486 A | 6/1999 | Walker et al. |
| 5,912,453 A | 6/1999 | Gungl et al. |
| 5,915,244 A | 6/1999 | Jack et al. |
| 5,923,884 A | 7/1999 | Peyret et al. |
| 5,924,072 A | 7/1999 | Havens |
| 5,926,795 A | 7/1999 | Williams |
| 5,928,082 A | 7/1999 | Clapper, Jr. |
| 5,931,947 A | 8/1999 | Burns et al. |
| 5,937,391 A | 8/1999 | Ikeda et al. |
| 5,943,651 A | 8/1999 | Oosawa |
| 5,950,173 A | 9/1999 | Perkowski |
| 5,953,047 A | 9/1999 | Nemirofsky |
| 5,953,705 A | 9/1999 | Oneda |
| 5,956,694 A | 9/1999 | Powell |
| 5,956,695 A | 9/1999 | Carrithers et al. |
| 5,958,174 A | 9/1999 | Ramsberg et al. |
| 5,960,082 A | 9/1999 | Haenel |
| 5,963,917 A | 10/1999 | Ogram |
| 5,969,318 A | 10/1999 | Mackenthun |
| 5,970,469 A | 10/1999 | Scroggie et al. |
| 5,974,399 A | 10/1999 | Giuliani et al. |
| 5,974,549 A | 10/1999 | Golan |
| 5,978,013 A | 11/1999 | Jones et al. |
| 5,987,795 A | 11/1999 | Wilson |
| 5,997,042 A | 12/1999 | Blank |
| 6,000,608 A | 12/1999 | Dorf |
| 6,002,771 A | 12/1999 | Nielsen |
| 6,003,113 A | 12/1999 | Hoshino |
| 6,003,134 A | 12/1999 | Kuo et al. |

(56) References Cited

U.S. PATENT DOCUMENTS

| | | |
|---|---|---|
| 6,005,942 A | 12/1999 | Chan et al. |
| 6,009,411 A | 12/1999 | Kepecs |
| 6,012,635 A | 1/2000 | Shimada et al. |
| 6,014,634 A | 1/2000 | Scroggie et al. |
| 6,024,286 A | 2/2000 | Bradley et al. |
| 6,035,280 A | 3/2000 | Christensen |
| 6,038,551 A | 3/2000 | Barlow et al. |
| 6,041,309 A | 3/2000 | Laor |
| 6,047,325 A | 4/2000 | Jain et al. |
| 6,049,778 A | 4/2000 | Walker et al. |
| 6,052,468 A | 4/2000 | Hillhouse |
| 6,052,690 A | 4/2000 | de Jong |
| 6,052,785 A | 4/2000 | Lin et al. |
| 6,055,509 A | 4/2000 | Powell |
| 6,061,660 A | 5/2000 | Eggleston et al. |
| 6,067,526 A | 5/2000 | Powell |
| 6,070,147 A | 5/2000 | Harms et al. |
| 6,073,238 A | 6/2000 | Drupsteen |
| 6,076,068 A | 6/2000 | DeLapa et al. |
| 6,076,069 A | 6/2000 | Laor |
| 6,089,611 A | 7/2000 | Blank |
| 6,094,656 A | 7/2000 | De Jong |
| 6,101,422 A | 8/2000 | Furlong |
| 6,101,477 A | 8/2000 | Hohle et al. |
| 6,105,002 A | 8/2000 | Powell |
| 6,105,865 A | 8/2000 | Hardesty |
| 6,105,873 A | 8/2000 | Jeger |
| 6,112,987 A | 9/2000 | Lambert et al. |
| 6,112,988 A | 9/2000 | Powell |
| 6,119,933 A | 9/2000 | Wong et al. |
| 6,119,945 A | 9/2000 | Muller et al. |
| 6,122,631 A | 9/2000 | Berbec et al. |
| 6,129,274 A | 10/2000 | Suzuki |
| 6,144,948 A | 11/2000 | Walker et al. |
| 6,151,586 A | 11/2000 | Brown |
| 6,151,587 A | 11/2000 | Matthias |
| 6,154,751 A | 11/2000 | Ault et al. |
| 6,161,870 A | 12/2000 | Blank |
| 6,164,549 A | 12/2000 | Richards |
| 6,170,061 B1 | 1/2001 | Beser |
| 6,173,269 B1 | 1/2001 | Solokl et al. |
| 6,173,891 B1 | 1/2001 | Powell |
| 6,179,205 B1 | 1/2001 | Sloan |
| 6,179,710 B1 | 1/2001 | Sawyer et al. |
| 6,183,017 B1 | 2/2001 | Najor et al. |
| 6,185,541 B1 | 2/2001 | Scroggie et al. |
| 6,189,100 B1 | 2/2001 | Barr et al. |
| 6,189,787 B1 | 2/2001 | Dorf |
| 6,195,666 B1 | 2/2001 | Schneck et al. |
| 6,210,276 B1 | 4/2001 | Mullins |
| 6,216,014 B1 | 4/2001 | Proust et al. |
| 6,216,204 B1 | 4/2001 | Thiriet |
| 6,220,510 B1 | 4/2001 | Everett et al. |
| 6,222,914 B1 | 4/2001 | McMullin |
| 6,230,143 B1 | 5/2001 | Simons et al. |
| 6,237,145 B1 | 5/2001 | Narasimhan et al. |
| 6,241,287 B1 | 6/2001 | Best et al. |
| 6,243,687 B1 | 6/2001 | Powell |
| 6,243,688 B1 | 6/2001 | Kalina |
| 6,244,958 B1 | 6/2001 | Acres |
| 6,266,647 B1 | 7/2001 | Fernandez |
| 6,267,263 B1 | 7/2001 | Emoff et al. |
| 6,269,158 B1 | 7/2001 | Kim |
| 6,279,112 B1 | 8/2001 | O'Toole, Jr. et al. |
| 6,282,516 B1 | 8/2001 | Giuliani |
| 6,292,785 B1 | 9/2001 | McEvoy et al. |
| 6,292,786 B1 | 9/2001 | Deaton et al. |
| 6,296,191 B1 | 10/2001 | Hamann et al. |
| 6,299,530 B1 | 10/2001 | Hansted et al. |
| 6,321,208 B1 | 11/2001 | Barnett et al. |
| 6,385,723 B1 | 5/2002 | Richards |
| 6,390,374 B1 | 5/2002 | Carper et al. |
| 6,480,935 B1 | 11/2002 | Carper et al. |
| 6,549,773 B1 | 4/2003 | Linden et al. |
| 6,549,912 B1 | 4/2003 | Chen |
| 6,612,490 B1 | 9/2003 | Herrendoerfer et al. |
| 6,681,995 B2 | 1/2004 | Sukeda et al. |
| 6,689,345 B2 | 2/2004 | Jager Lezer |
| 6,932,270 B1 | 8/2005 | Fajkowski |
| 7,006,983 B1 | 2/2006 | Packes et al. |
| 8,010,405 B1 | 8/2011 | Bortolin et al. |
| 8,433,608 B2 * | 4/2013 | Bortolin et al. ............... 705/14.1 |
| 2001/0014868 A1 | 8/2001 | Herz et al. |
| 2001/0032128 A1 | 10/2001 | Kepecs |
| 2002/0002468 A1 | 1/2002 | Spagna et al. |
| 2002/0076051 A1 | 6/2002 | Nii |

FOREIGN PATENT DOCUMENTS

| | | |
|---|---|---|
| CA | 2293944 | 8/2000 |
| CA | 2267041 | 9/2000 |
| CA | 2317138 | 1/2002 |
| DE | 19522527 | 1/1997 |
| DE | 19848712 | 4/2000 |
| DE | 19960978 | 8/2000 |
| DE | 10015103 | 10/2000 |
| EP | 0203424 | 12/1986 |
| EP | 0292248 | 11/1988 |
| EP | 0475837 | 3/1992 |
| EP | 0540095 | 5/1993 |
| EP | 0658862 | 6/1995 |
| EP | 0675614 | 10/1995 |
| EP | 0682327 | 11/1995 |
| EP | 0875841 | 11/1998 |
| EP | 0936530 | 8/1999 |
| EP | 0938050 | 8/1999 |
| EP | 0938051 | 8/1999 |
| EP | 0944007 | 9/1999 |
| EP | 0949595 | 10/1999 |
| EP | 0982692 | 3/2000 |
| EP | 0984404 | 3/2000 |
| EP | 1039403 | 9/2000 |
| EP | 1085395 | 3/2001 |
| EP | 1102320 | 5/2001 |
| EP | 1111505 | 6/2001 |
| EP | 1113387 | 7/2001 |
| EP | 1113407 | 7/2001 |
| EP | 1168137 | 1/2002 |
| EP | 1233333 | 8/2002 |
| FR | 2772957 | 6/1999 |
| FR | 2793048 | 11/2000 |
| FR | 2794543 | 12/2000 |
| FR | 2796176 | 1/2001 |
| FR | 2804234 | 7/2001 |
| GB | 2331381 | 5/1999 |
| GB | 2343091 | 4/2000 |
| GB | 2351379 | 12/2000 |
| GB | 2355324 | 4/2001 |
| JP | 2000-112864 | 4/2000 |
| JP | 2000-181764 | 6/2000 |
| JP | 2001-202484 | 7/2001 |
| JP | 2001-236232 | 8/2001 |
| KR | 0039297 | 5/2001 |
| KR | 0044823 | 6/2001 |
| KR | 0058742 | 7/2001 |
| KR | 0021237 | 3/2002 |
| WO | WO 90/16126 | 12/1990 |
| WO | WO 96/25724 | 8/1996 |
| WO | WO 96/38945 | 12/1996 |
| WO | WO 96/42109 | 12/1996 |
| WO | WO 97/05582 | 2/1997 |
| WO | WO 97/10562 | 3/1997 |
| WO | WO 97/39424 | 10/1997 |
| WO | WO 98/02834 | 1/1998 |
| WO | WO 98/09257 | 3/1998 |
| WO | WO 98/20465 | 5/1998 |
| WO | WO 98/43169 | 10/1998 |
| WO | WO 98/43212 | 10/1998 |
| WO | WO 98/52153 | 11/1998 |
| WO | WO 99/10824 | 3/1999 |
| WO | WO 99/16030 | 4/1999 |
| WO | WO 99/19846 | 4/1999 |
| WO | WO 99/44172 | 9/1999 |
| WO | WO 99/45507 | 9/1999 |

(56) References Cited

FOREIGN PATENT DOCUMENTS

| | | |
|---|---|---|
| WO | WO 99/49415 | 9/1999 |
| WO | WO 99/49426 | 9/1999 |
| WO | WO 00/39714 | 7/2000 |
| WO | WO 00/46665 | 8/2000 |
| WO | WO 00/54507 | 9/2000 |
| WO | WO 00/57315 | 9/2000 |
| WO | WO 00/57613 | 9/2000 |
| WO | WO 00/62265 | 10/2000 |
| WO | WO 00/62472 | 10/2000 |
| WO | WO 00/67185 | 11/2000 |
| WO | WO 00/68797 | 11/2000 |
| WO | WO 00/68902 | 11/2000 |
| WO | WO 00/68903 | 11/2000 |
| WO | WO 00/69183 | 11/2000 |
| WO | WO 00/75775 | 12/2000 |
| WO | WO 00/77750 | 12/2000 |
| WO | WO 01/04851 | 1/2001 |
| WO | WO 01/06341 | 1/2001 |
| WO | WO 02/06948 | 1/2001 |
| WO | WO 01/08087 | 2/2001 |
| WO | WO 01/13572 | 2/2001 |
| WO | WO 01/15397 | 3/2001 |
| WO | WO 01/18633 | 3/2001 |
| WO | WO 01/18746 | 3/2001 |
| WO | WO 01/29672 | 4/2001 |
| WO | WO 01/33390 | 5/2001 |
| WO | WO 01/40908 | 6/2001 |
| WO | WO 01/42887 | 6/2001 |
| WO | WO 01/44900 | 6/2001 |
| WO | WO 01/44949 | 6/2001 |
| WO | WO 01/47176 | 6/2001 |
| WO | WO 01/50229 | 7/2001 |
| WO | WO 01/52575 | 7/2001 |
| WO | WO 01/55955 | 8/2001 |
| WO | WO 01/59583 | 8/2001 |
| WO | WO 01/61620 | 8/2001 |
| WO | WO 01/65545 | 9/2001 |
| WO | WO 01/67694 | 9/2001 |
| WO | WO 01/71648 | 9/2001 |
| WO | WO 01/71679 | 9/2001 |
| WO | WO 01/73530 | 10/2001 |
| WO | WO 01/73533 | 10/2001 |
| WO | WO 01/78020 | 10/2001 |
| WO | WO 01/80563 | 10/2001 |
| WO | WO 01/84377 | 11/2001 |
| WO | WO 01/84474 | 11/2001 |
| WO | WO 01/84512 | 11/2001 |
| WO | WO 01/88705 | 11/2001 |
| WO | WO 02/10962 | 2/2002 |
| WO | WO 02/14991 | 2/2002 |
| WO | WO 02/15037 | 2/2002 |
| WO | WO 02/21315 | 3/2002 |
| WO | WO 02/29577 | 4/2002 |
| WO | WO 02/088895 | 11/2002 |

* cited by examiner

METHOD AND SYSTEM FOR DETERMINING REWARDS

CROSS-REFERENCES TO RELATED APPLICATION(S)

This application is a continuation of U.S. patent application Ser No. 13/157,251 filed Jun. 9, 2011, now U.S. Pat. No. 8,433,608, which is a continuation of U.S. patent application Ser. No. 10/365,711 filed Feb. 11, 2003, now U.S. Pat. No. 8,010,405, which claims the benefit of priority under 35 U.S.C. §119 from U.S. Provisional Patent Application Ser. No. 60/399,000, filed on Jul. 26, 2002, the disclosures of which are hereby incorporated by reference in their entirety for all purposes.

BACKGROUND OF THE INVENTION

The present invention generally relates to reward selection and redemption in a loyalty program. More specifically, the present invention relates to a method and system for facilitating reward selection and redemption in a loyalty program.

Under conventional practice, participants in a smartcard- or electronic-based loyalty program generally receive their rewards automatically without being given any opportunity to decide whether they wish to receive or redeem such rewards. Typically, once a participant's reward level has reached a specific threshold that entitles the participant to receive his/her reward, the reward is automatically given out to the participant. The participant is not offered a chance to choose whether to redeem or defer the reward. Due to practical constraints, automatic reward redemption may be desirable in certain situations, such as, a situation where the reward to be given is relatively small. In other situations, however, automatic reward redemption may lead to customer dissatisfaction. For example, if a participant is entitled to receive a reward in the form of a substantial discount for a future purchase and this discount is automatically applied without first consulting the participant, the participant may feel dissatisfied by the missed opportunity to fully take advantage of the reward which s/he has earned. Such dissatisfaction may eventually impact participation in a loyalty program. As more and more participants become unhappy with the way rewards are redeemed, these participants are less likely to continue to participate in the loyalty program which, in turn, leads to loss of business.

Hence, it would be desirable to provide a method and system that is capable of facilitating reward selection and redemption in a loyalty program to improve customer satisfaction.

BRIEF SUMMARY OF THE INVENTION

A system for facilitating reward selection and redemption for a loyalty program is disclosed. In an exemplary embodiment, the system includes a point-of-sale (POS) device that is capable of monitoring and processing a reward redemption. The POS device informs a participant of the loyalty program as to what rewards are available for redemption. The participant is given an opportunity by the POS device to select the desired reward for redemption. Alternatively, the POS device allows the participant to defer redemption of the available rewards.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
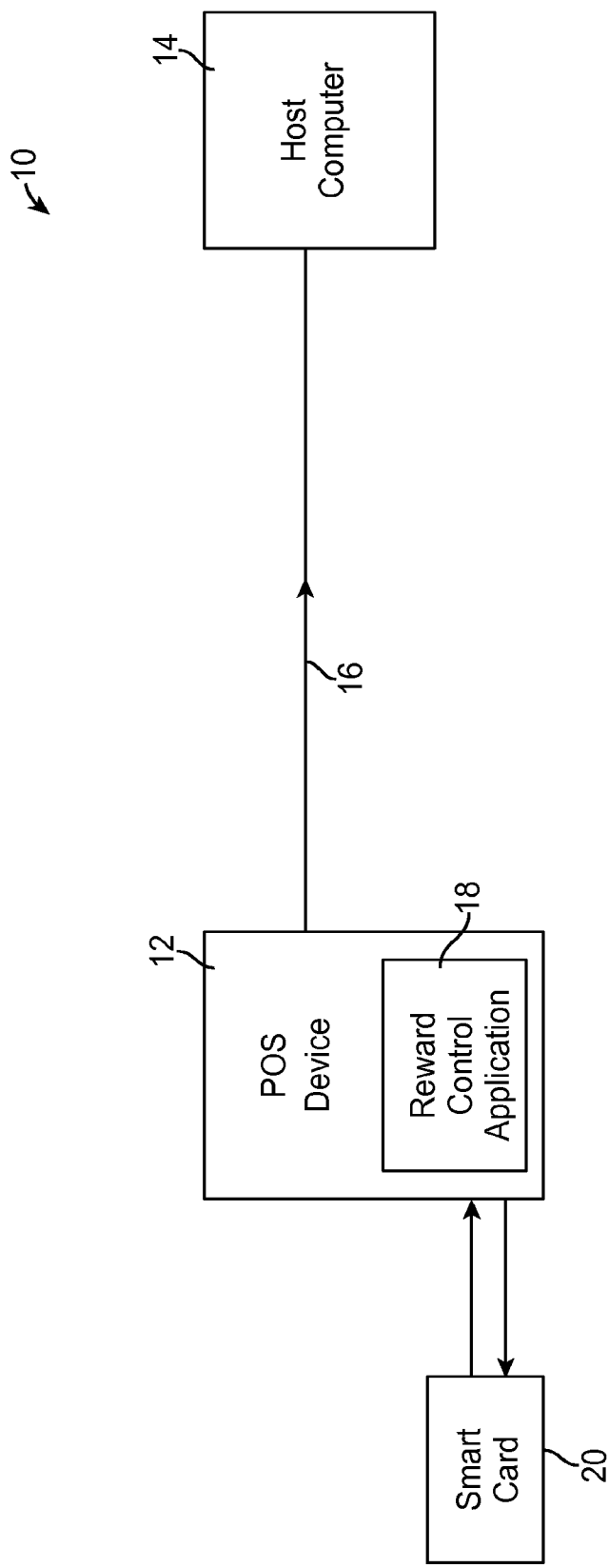
FIG. 1 is a simplified block diagram illustrating an exemplary embodiment of the present invention.

The present invention in the form of one or more exemplary embodiments will now be described. FIG. 1 is a simplified block diagram illustrating an exemplary embodiment of the present invention. This exemplary embodiment is a system 10 that includes a point-of-sale (POS) device 12 and a host computer 14. The POS device 12 and the host computer 14 are connected to each other via a communication link 16. The communication link 16 includes a dialup connection, a dedicated connection such as a T1 line, a computer network and the like.

The POS device 12 further includes a reward control application 18. In one exemplary implementation, the reward control application 18 is implemented as control logic and/or modules using computer software. As will be further described below, the reward control application 18 directs the POS device 12 to process pending transactions for reward purposes and allows a participant in a loyalty program to view the rewards that are available for redemption and choose when to redeem such rewards.

The POS device 12 also includes other components and/or applications (not shown) that may be needed to facilitate completion of transactions. For example, the POS device 12 may include a payment application (not shown) that facilitates payment for a transaction. Where appropriate, the reward control application 18 interacts with these other components and/or applications to properly monitor and control redemption of rewards relating to the loyalty program. It should be realized by a person of ordinary skill in the art that the components and/or applications included in the POS device 12 may be implemented in a modular or integrated manner. In other words, the respective functionality of these components and/or applications may be implemented and distributed amongst one or more modules within the POS device 12.

In one exemplary embodiment, the POS device 12 is equipped to function in cooperation with a smartcard 20. The smartcard 20 includes one or more applications. One of these applications includes, for example, a loyalty application that relates to a loyalty program of which the smartcard-holder is a participant. The loyalty application may include information relating to the loyalty program and the smartcard-holder. As will be further described below, the applications and information stored in the smartcard 20 are used by the reward control application 18 to facilitate reward redemption.

In one exemplary embodiment, the reward control application 18 operates in a standalone or offline manner. In other words, the reward control application 18 by itself is able to handle reward redemption requested by a smartcard-holder. Statistics and other accounting and historical information is periodically transmitted from the POS device 12 to the host computer 14 via the communication link 16 for settlement and accounting purposes. However, it should he understood that, alternatively, the reward control application 18 may also function in cooperation with the host computer 14 to handle reward redemption.

In an exemplary embodiment, the option to accept or defer the redemption of an earned reward has two configuration options. The first option is to configure at the loyalty program level and the second option is to configure at the POS device level on the host computer 14. In one exemplary implementation, the POS device level settings and the loyalty program level settings reside in the POS device 12. At the program level, there are two set up options. One option is that the program is defined as auto redemption only. The second option is that the program is manual redemption capable. For programs that are set up for auto redemption, the POS device 12 is configured to offer only auto redemption (regardless of the POS setting). For programs that are set up for manual redemption, the POS device 12 controls whether the POS device 12 actually displays the manual redemption or auto redemption option, i.e., either option is available.

Figure 2:
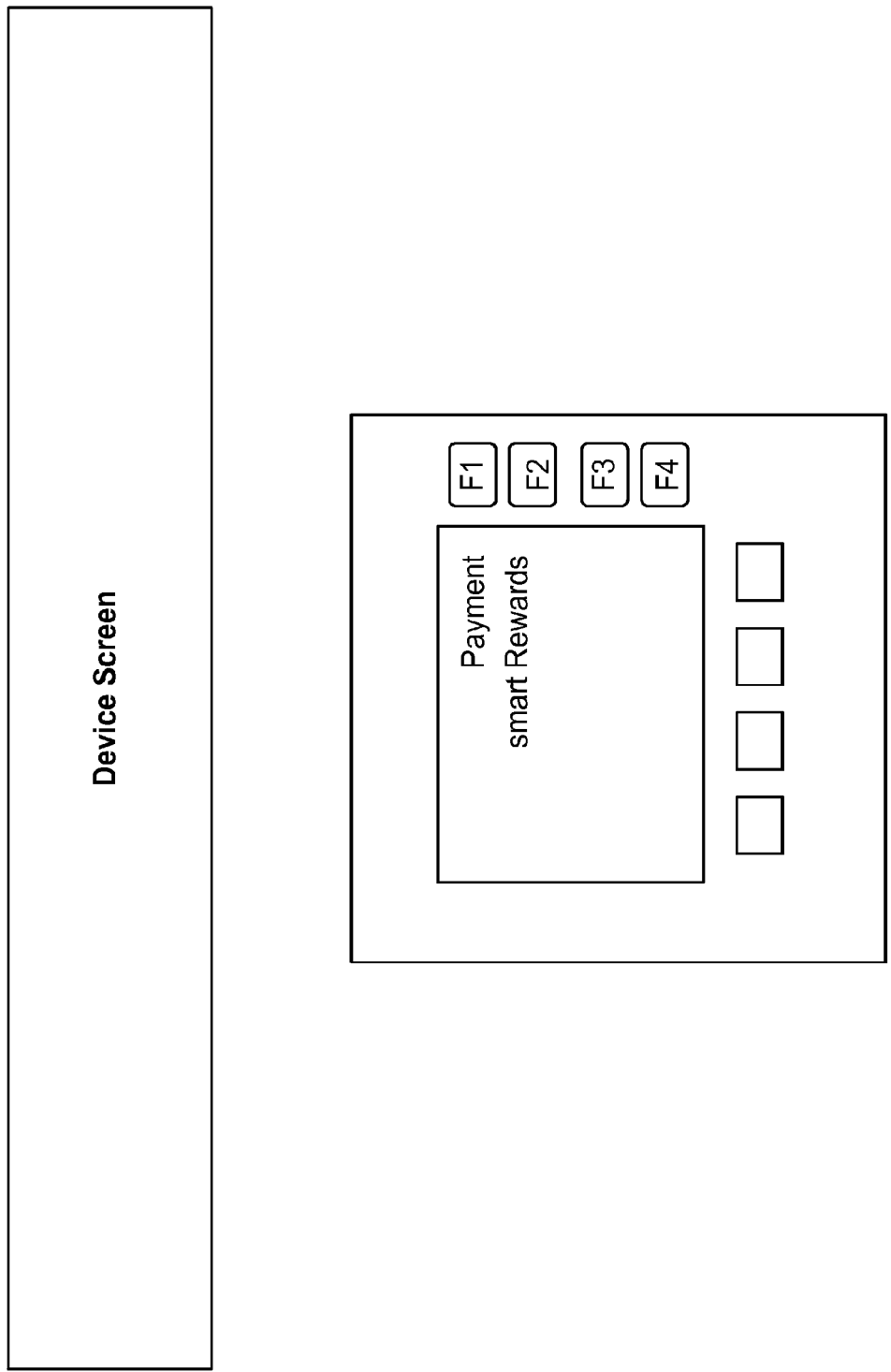
FIGS. 2-15 are simplified schematic diagrams illustrating operations of an exemplary embodiment of the present invention.

The reward control application 18 operates in the following exemplary manner to control the POS device 12 in order to handle reward selection and redemption. Referring to FIG. 2, the POS device 12 initially displays two options for selection. The selection can be made by either the smartcard-holder or a store clerk handling the transaction. The two options are the payment option and the reward option. If the payment option is selected, then the POS device 12 simply processes the transaction as a payment using, for example, a payment application. That is, this transaction is not to be counted for reward purposes in the loyalty program.

On the other hand, if the reward option is selected, then the reward control application 18 is invoked. Optionally, the POS device 12 may be configured to invoke the reward control application 18 once the smartcard 20 is inserted into the POS device 12.

Figure 3:
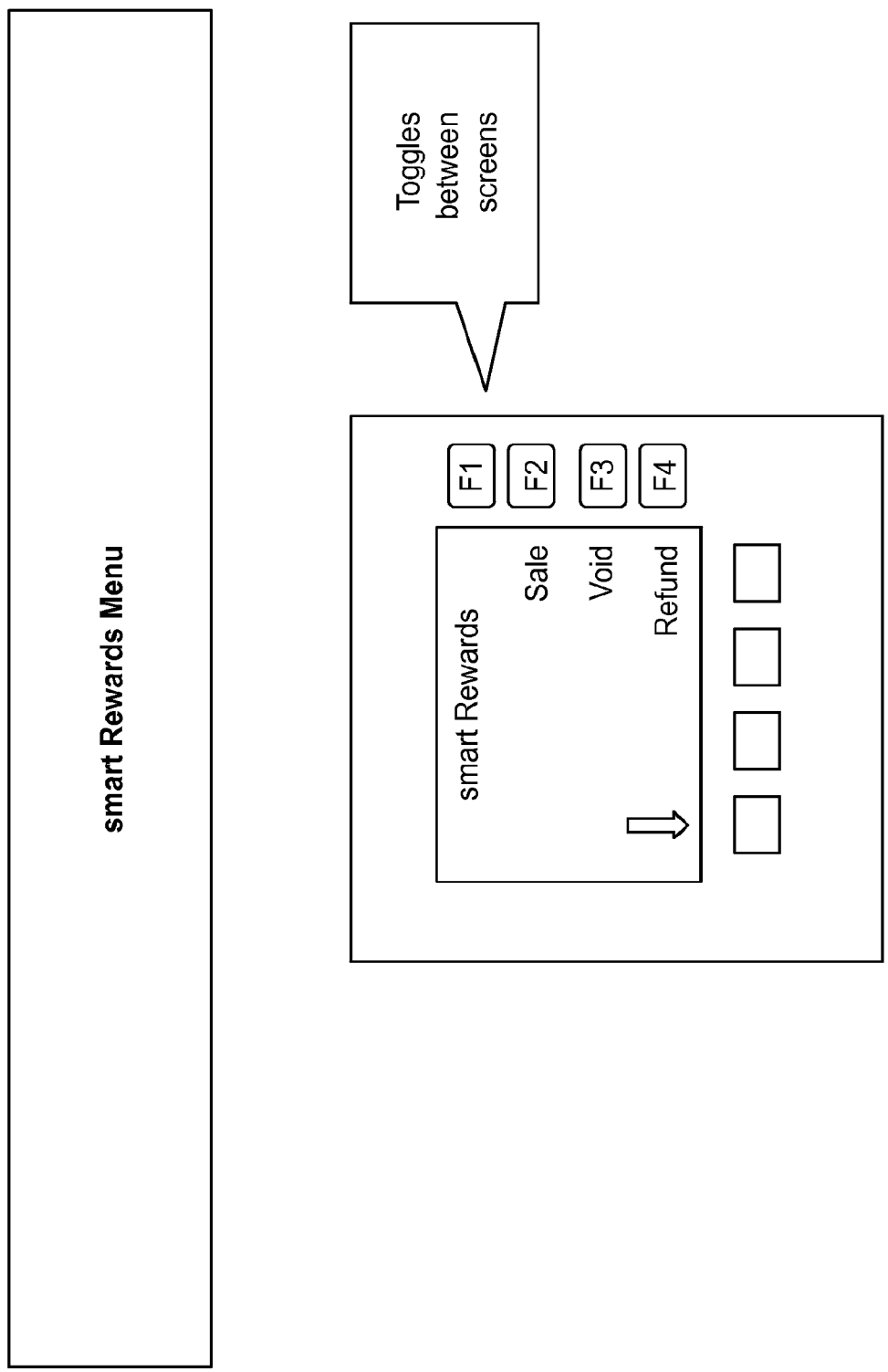

FIG. 3 illustrates what the POS device 12 will show on its display when the reward option is selected. When the reward option is selected, the pending transaction is to be counted for reward purposes in the loyalty program. Three options are displayed for selection, namely, the sale option, the void option and the refund option.

Figure 4:
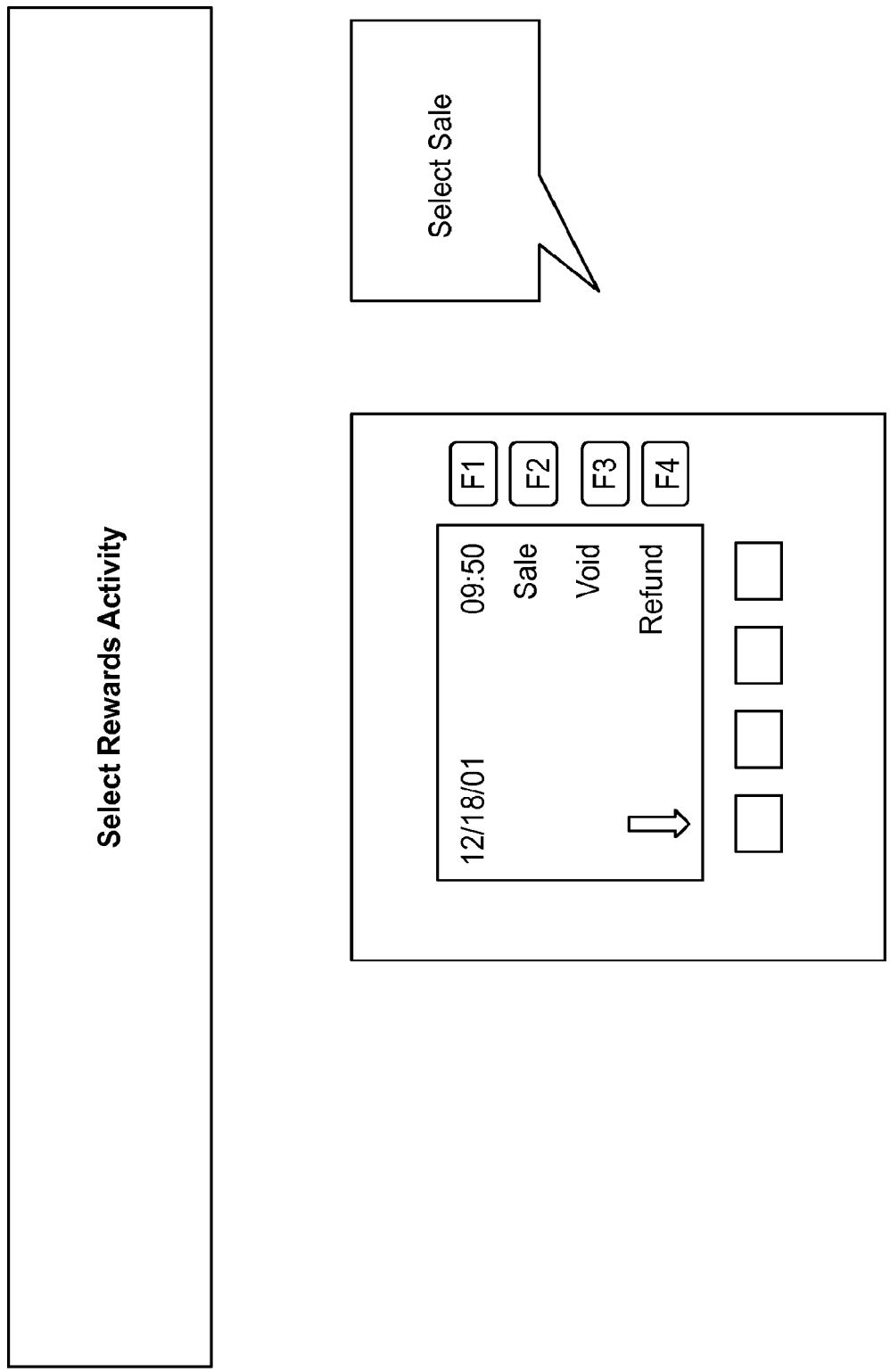

The sale option is selected when the transaction is a sale and information from this sale is to be collected for reward purposes. The void option is selected when the pending transaction is to be voided. A number of situations may arise requiring the pending transaction to be voided. This may happen when, for example, incorrect transactional information has been entered. The refund option is selected when a previously executed transaction is to be reversed. A number of situations may arise requiring the previously executed transaction to be reversed. This may happen when, for example, a customer returns a previously purchased item, hence, prompting the need to reverse the previously executed transaction. In one exemplary embodiment, reward attributed to the previously executed transaction that is to be reversed is not deducted or retracted. However, it should be understood that, in other embodiments, rewards resulted from previously executed transactions that are to he reversed may be treated differently depending on the design and/or rules of the specific loyalty program. Optionally, additional information may be displayed in a toggled manner by the POS device 12 when the reward option is selected. For example, as shown in FIG. 4, in addition to showing the three options that are available, the POS device 12 may also display the current time and date.

Figure 5:
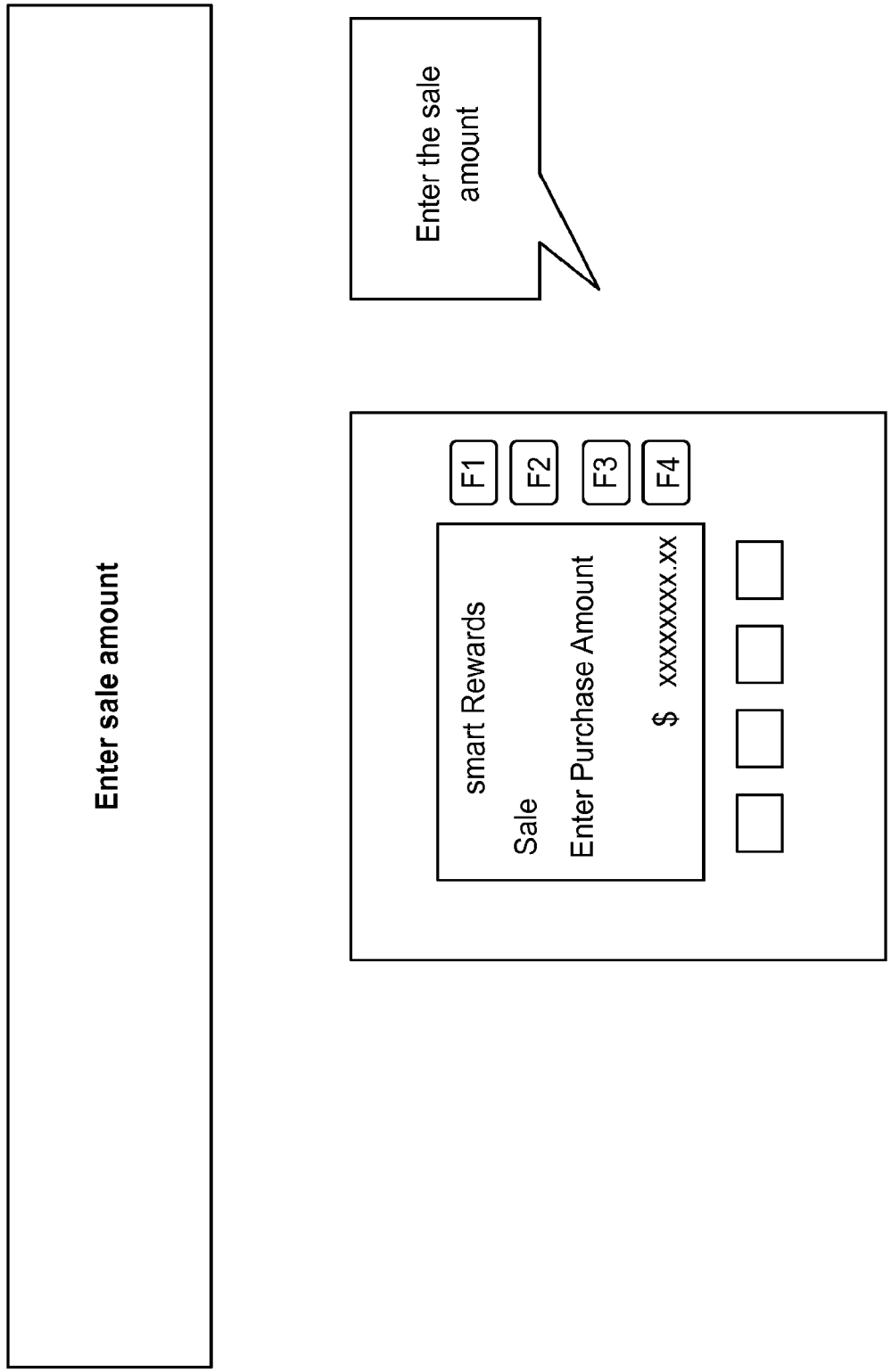

FIG. 5 illustrates the situation where the sale option as shown in FIG. 3 is selected. At this point, the POS device 12 prompts for the sale or purchase amount to be entered. In an exemplary embodiment, the purchase amount is entered before any available, redeemable rewards are displayed. This is done because in some situations the purchase amount may have an immediate impact on the rewards that are available for redemption. For example, if one type of reward is designed to give a customer an immediate discount when the total transaction amount for a single transaction exceeds a certain predetermined threshold, then it would be necessary to ascertain the total transaction amount to determine whether the immediate discount is to be applied for that transaction.

Figure 6:
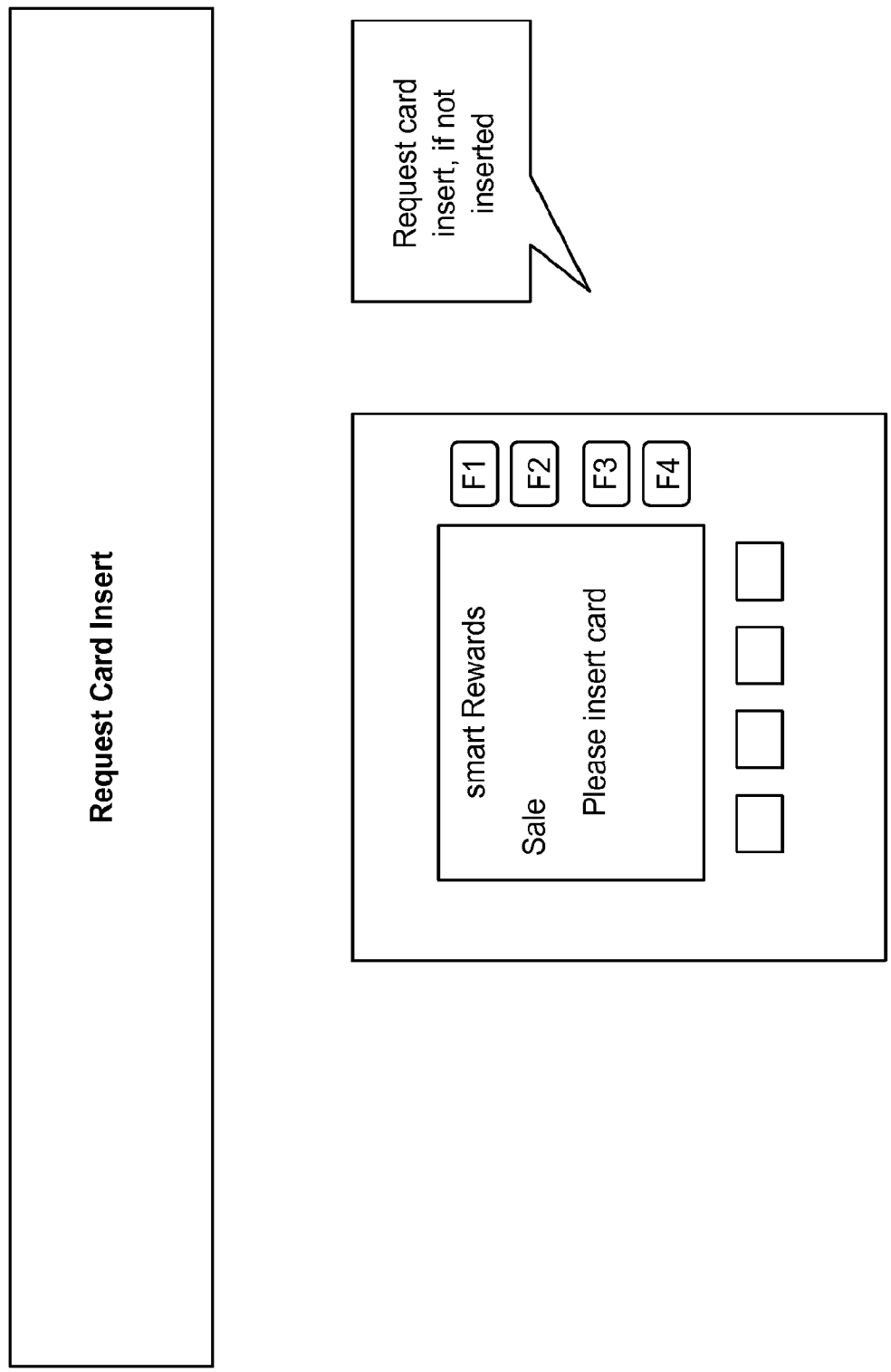

Referring to FIG. 6, after the purchase amount is entered, the POS device 12 prompts the smartcard-holder or the store clerk to insert the smartcard 20 into the POS device 12 for access, if the smartcard 20 has not been inserted already.

Figure 7:
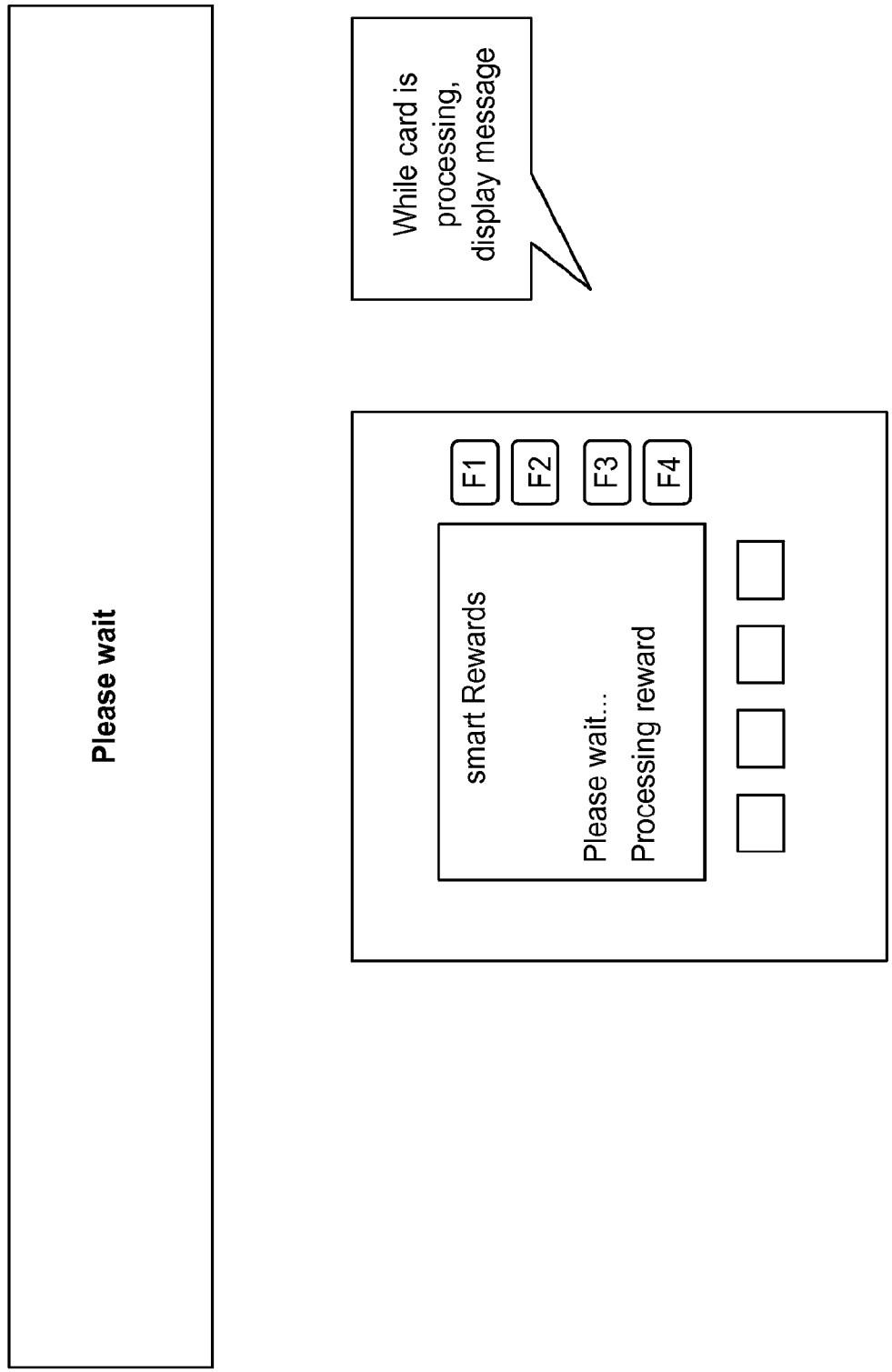

Once the smartcard 20 is inserted into the POS device 12, the POS device 12 begins to process the pending transaction for reward purposes. The processing includes, for example, checking whether the smartcard-holder is entitled to participate in the loyalty program offered by the sponsoring party. The sponsoring party may include, for example, a merchant, an issuer, a credit card association and other business entity. Since the POS device 12 is specific to a particular merchant, the reward control application 18 may further include rules and regulations that are specific to corresponding loyalty programs sponsored by the particular merchant and/or any other sponsoring parties. While the pending transaction is being processed, the POS device 12 displays a message, as shown in FIG. 7.

Figure 8:
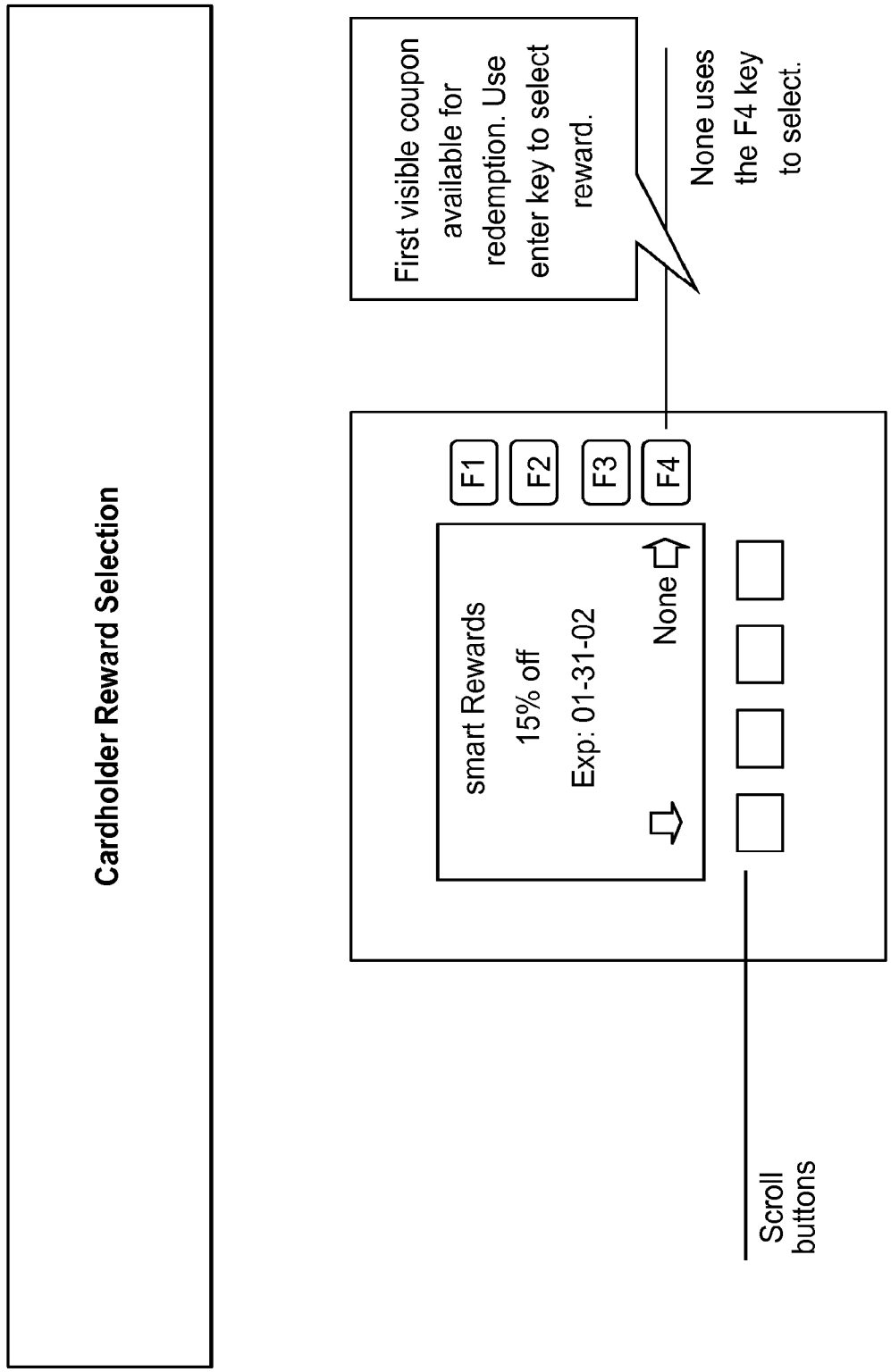
Figure 9:
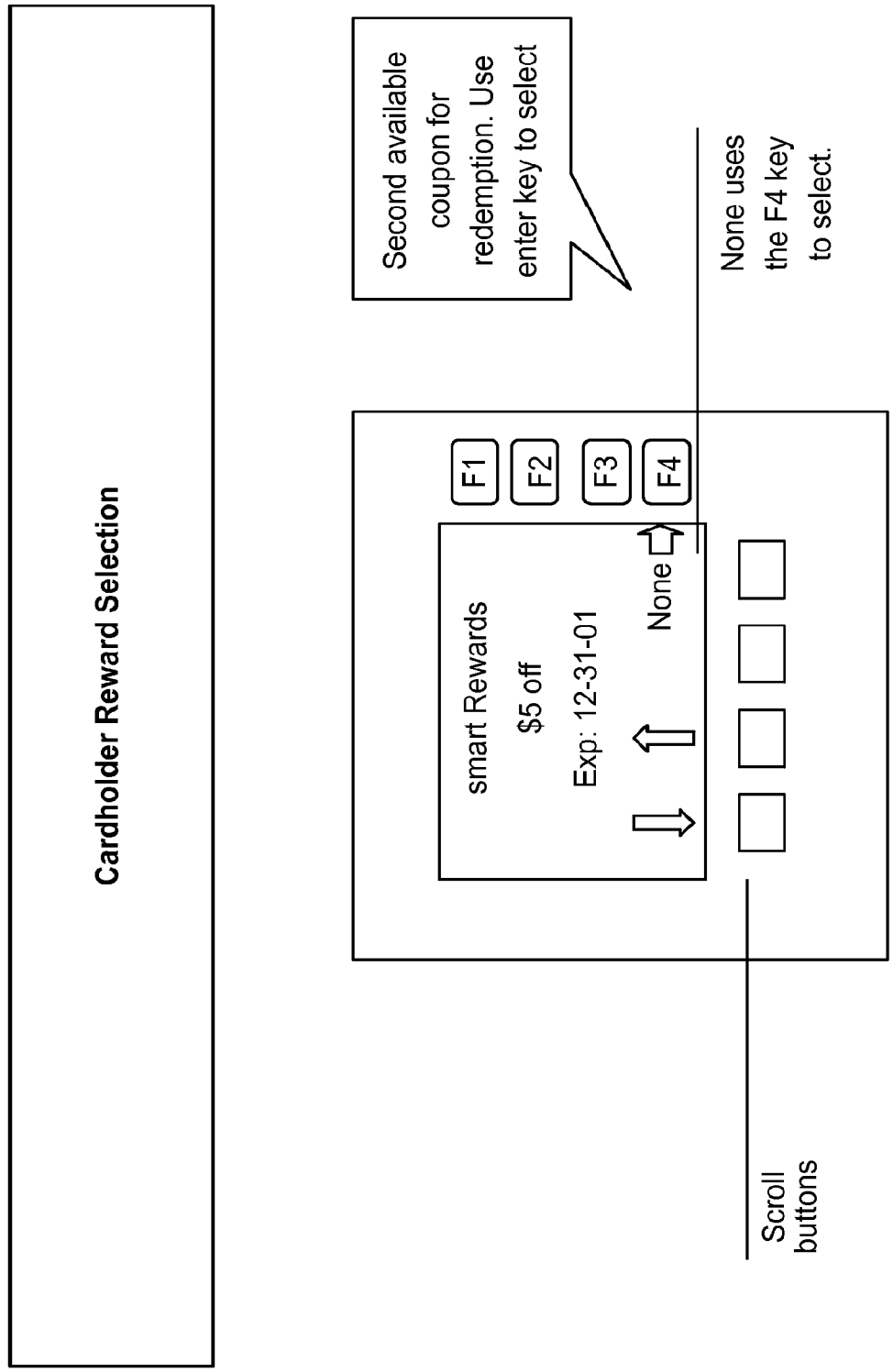

Referring to FIGS. 8 and 9, once the pending transaction is processed, the POS device 12 displays information relating to one or more rewards that arc available for redemption. Information relating to a reward may include, for example, the type of reward that is available and the expiration date. In an exemplary embodiment, the rewards are displayed in a predetermined order. For example, the rewards may be displayed in a descending order based on the respective values of the rewards. In another example, the displayed rewards are sorted based upon the closest reward expiration date to the farthest reward expiration date. In yet another example, if the respective dollar amounts of the rewards are the same for both rewards, the POS device 12 allows an additional sort to display the rewards based on expiration dates. A person of ordinary skill in the art will know how to implement the desired reward display orders.

In addition to displaying the available rewards, the POS device 12 is configured to allow a reward selection to be made for redemption. Depending on the rewards that are available for redemption, a participant may select one or more of the rewards for redemption. Alternatively, the participant may decide to defer or save the available rewards for use on other subsequent occasions, if applicable.

Figure 10:
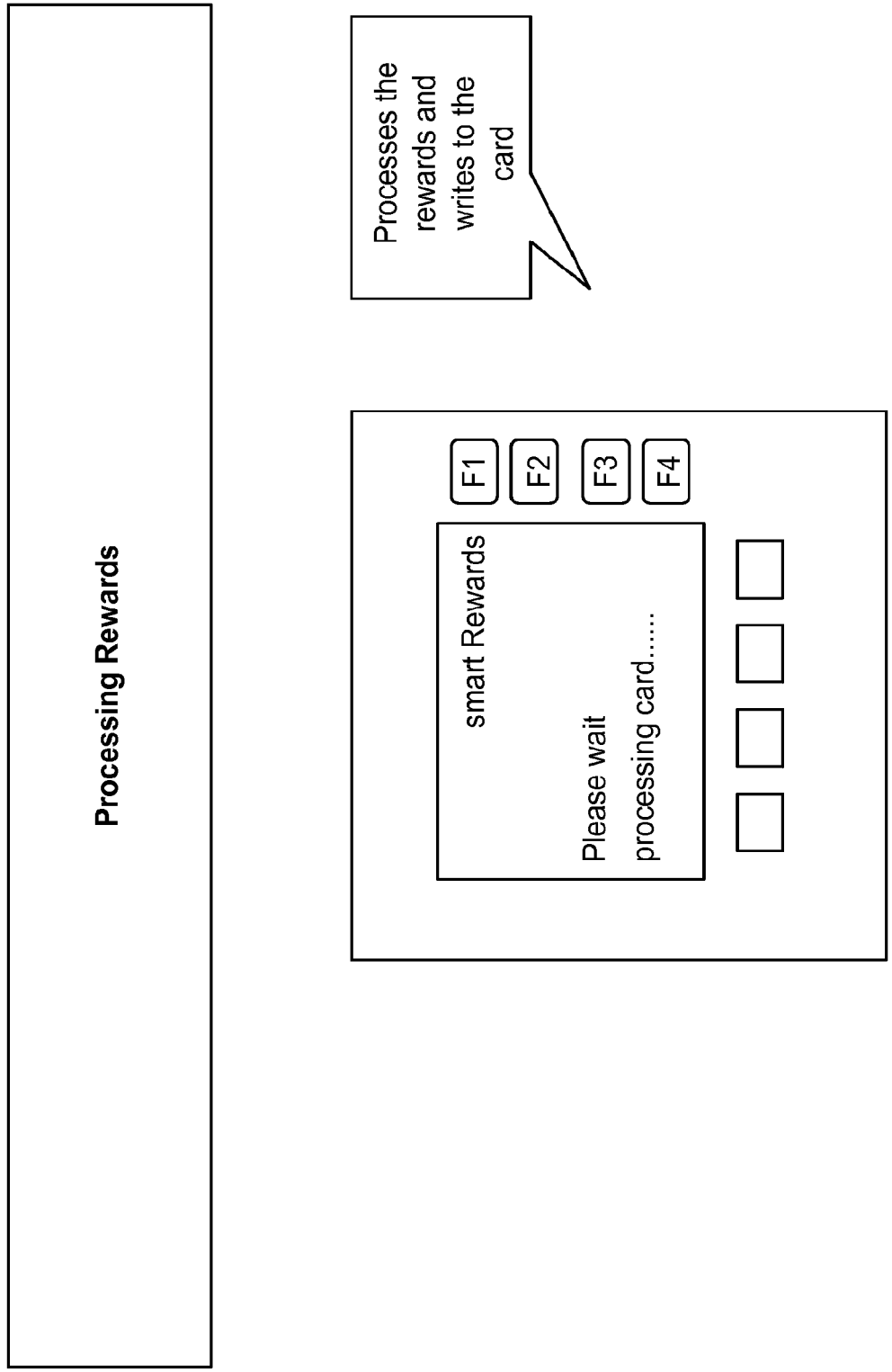

FIG. 10 illustrates the situation where the participant decides to select one of the available rewards for redemption. The POS device 12 transmits the appropriate information to update the contents of the smartcard 20 and displays a message informing the participant that the selected reward is being processed.

Figure 11:
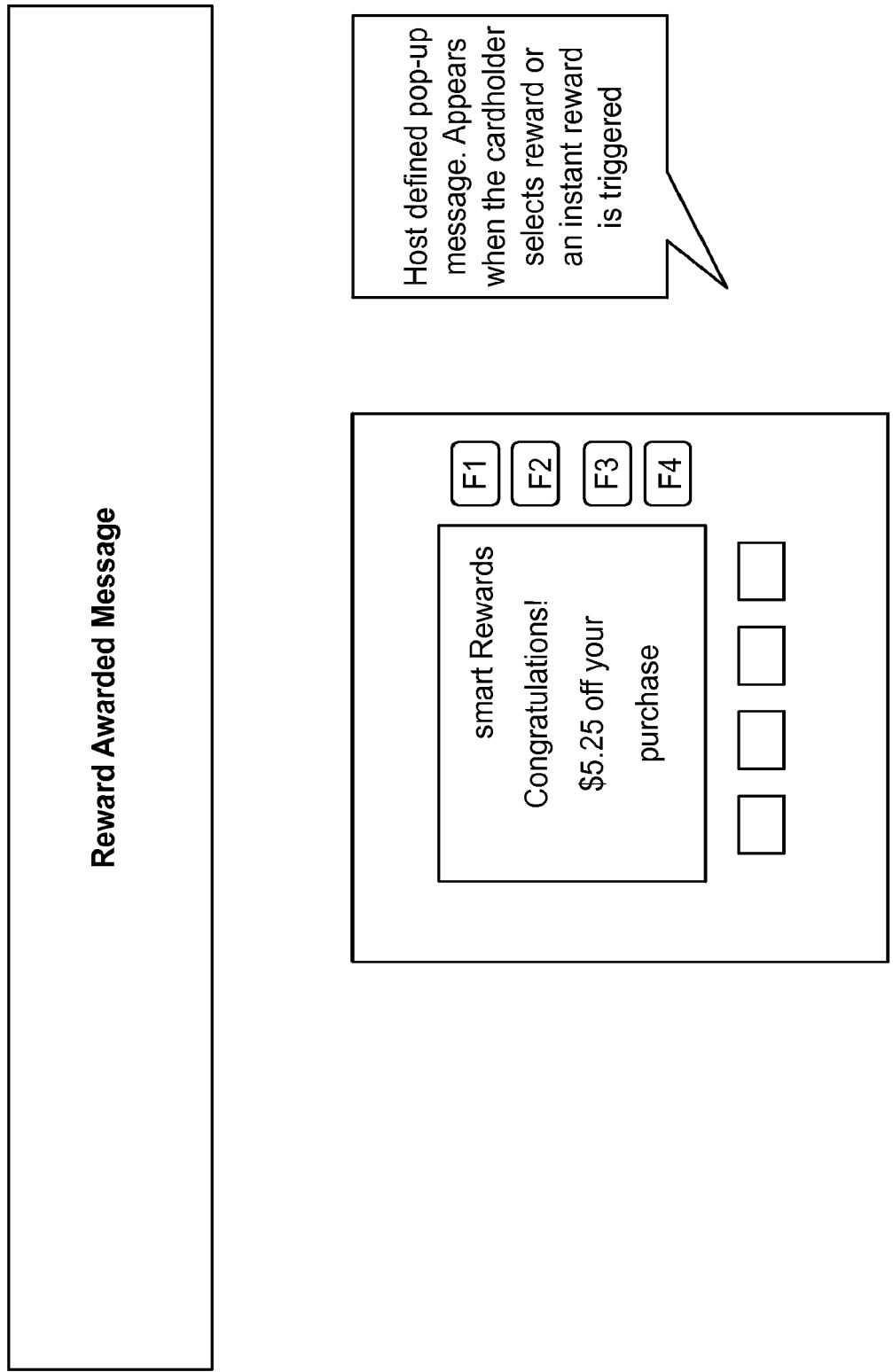

After the selected reward has been processed, the POS device 12 displays an appropriate congratulatory message, as shown in FIG. 11. Different types of messages may be displayed by the POS device 12. These messages may be customized to suit a corresponding loyalty program. For example, some messages may include information on the parties sponsoring the loyalty program such as, a merchant, an issuer and/or a credit card association. These messages arc defined at the host computer 14 and may be uploaded from the host computer 14 to the POS device 12. Optionally, these messages may be defined locally at the POS device 12.

Figure 12:
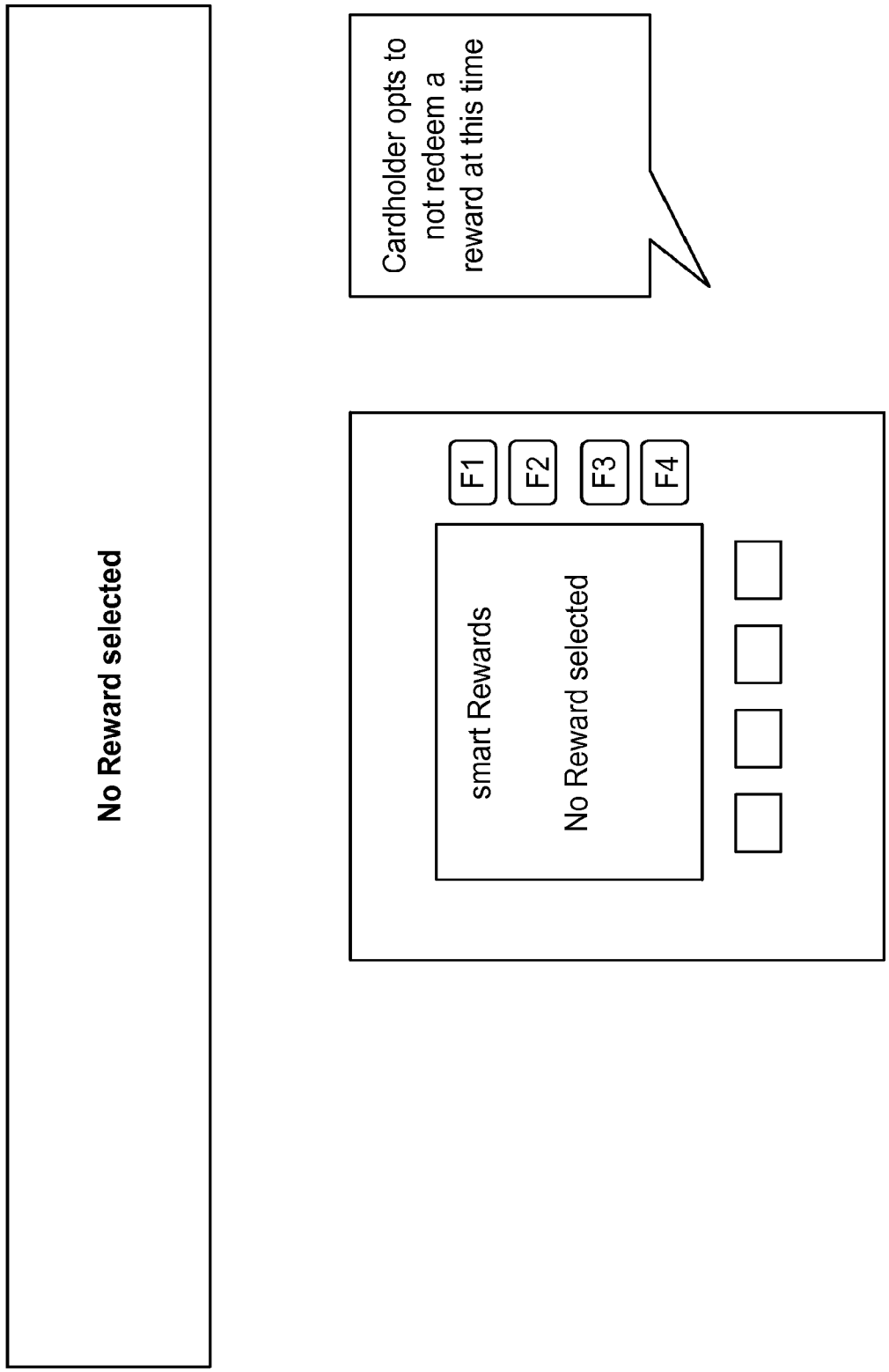

In the event that the participant decides to defer redemption of the available rewards, the POS device 12 accordingly displays a message indicating that no reward has been selected, as shown in FIG. 12.

Consequently, at the end of reward processing, the participant has either selected one reward for redemption or deferred the available rewards for redemption at a later time.

Figure 13:
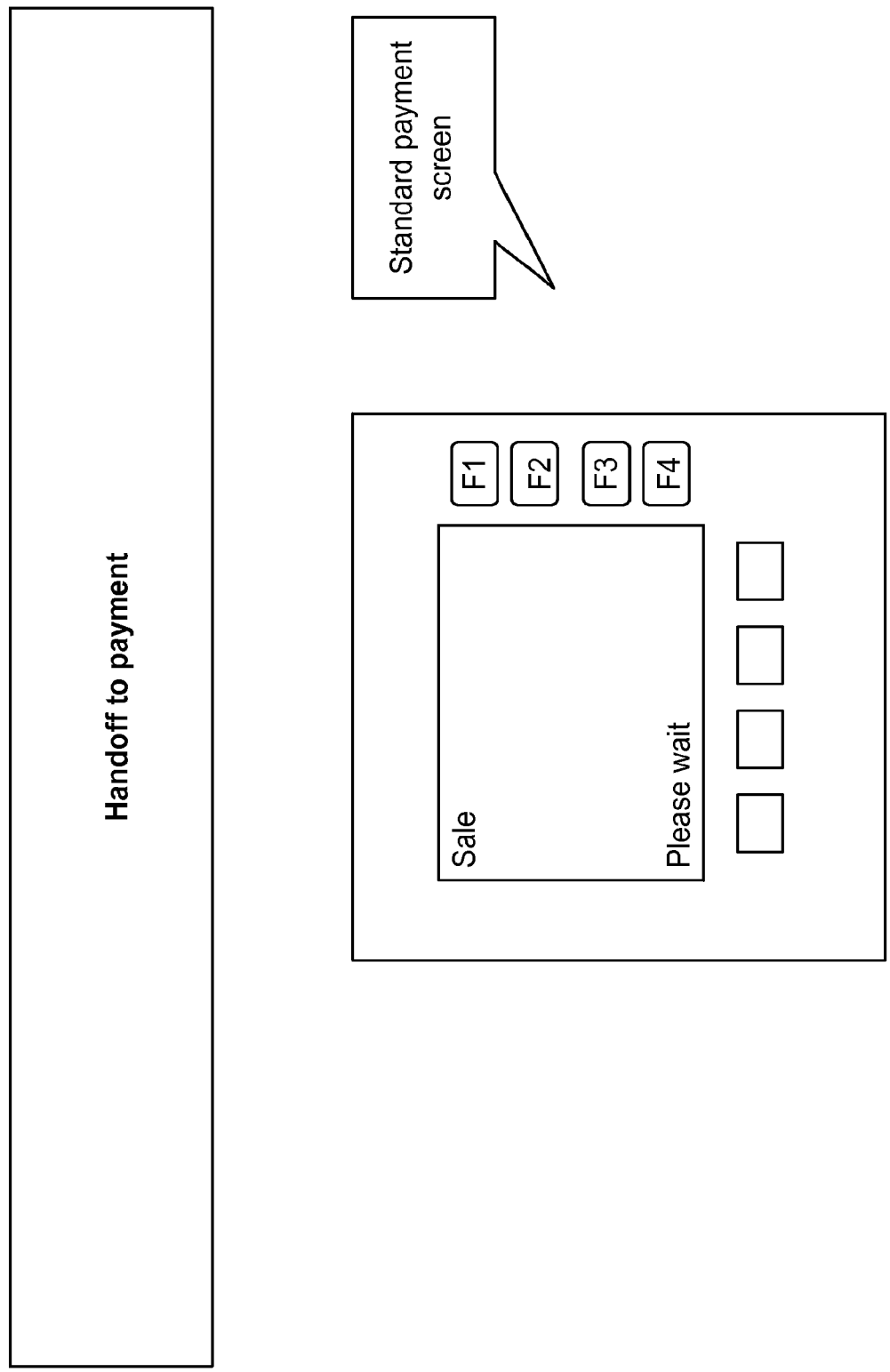
Figure 14:
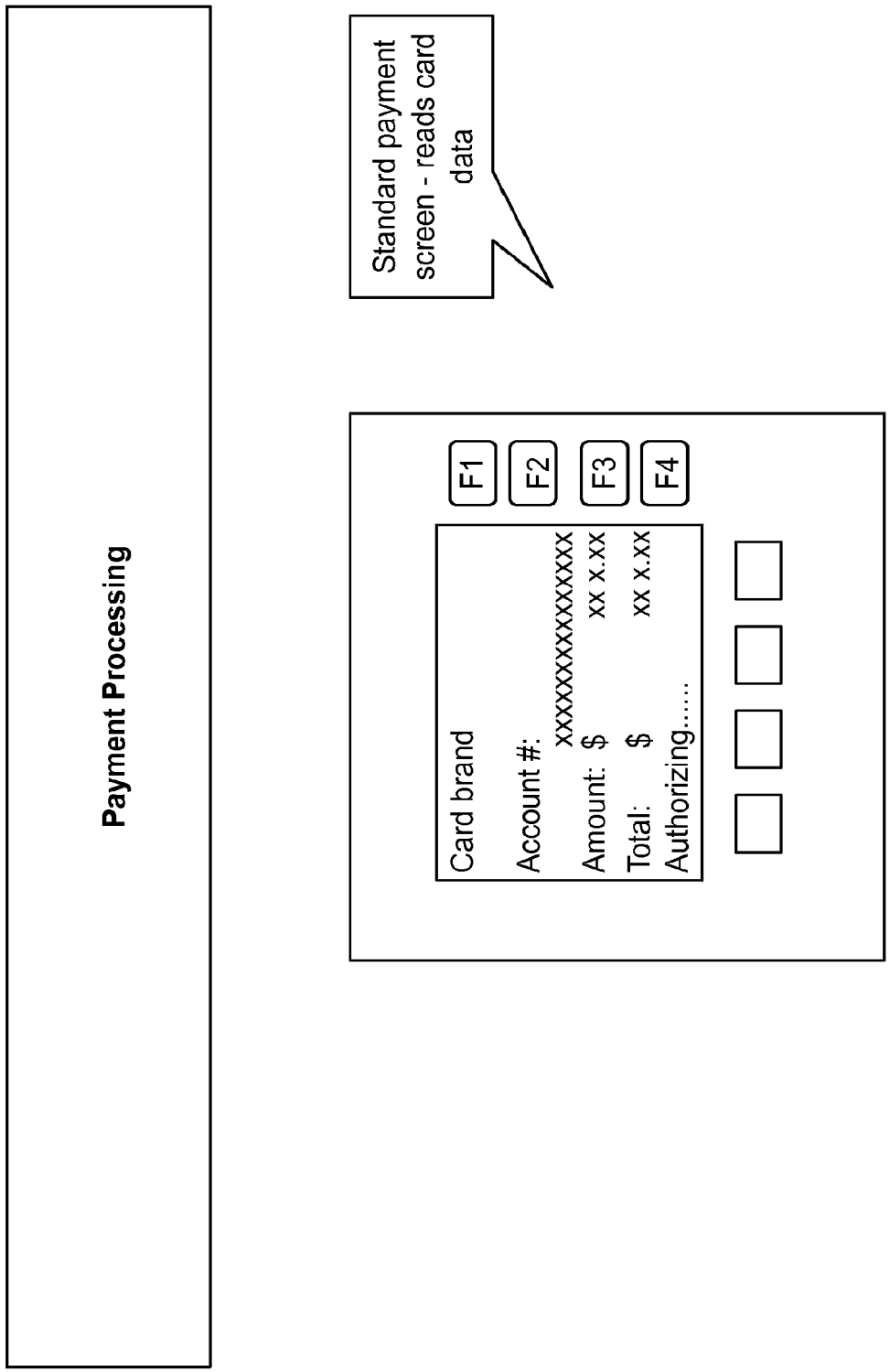
Figure 15:
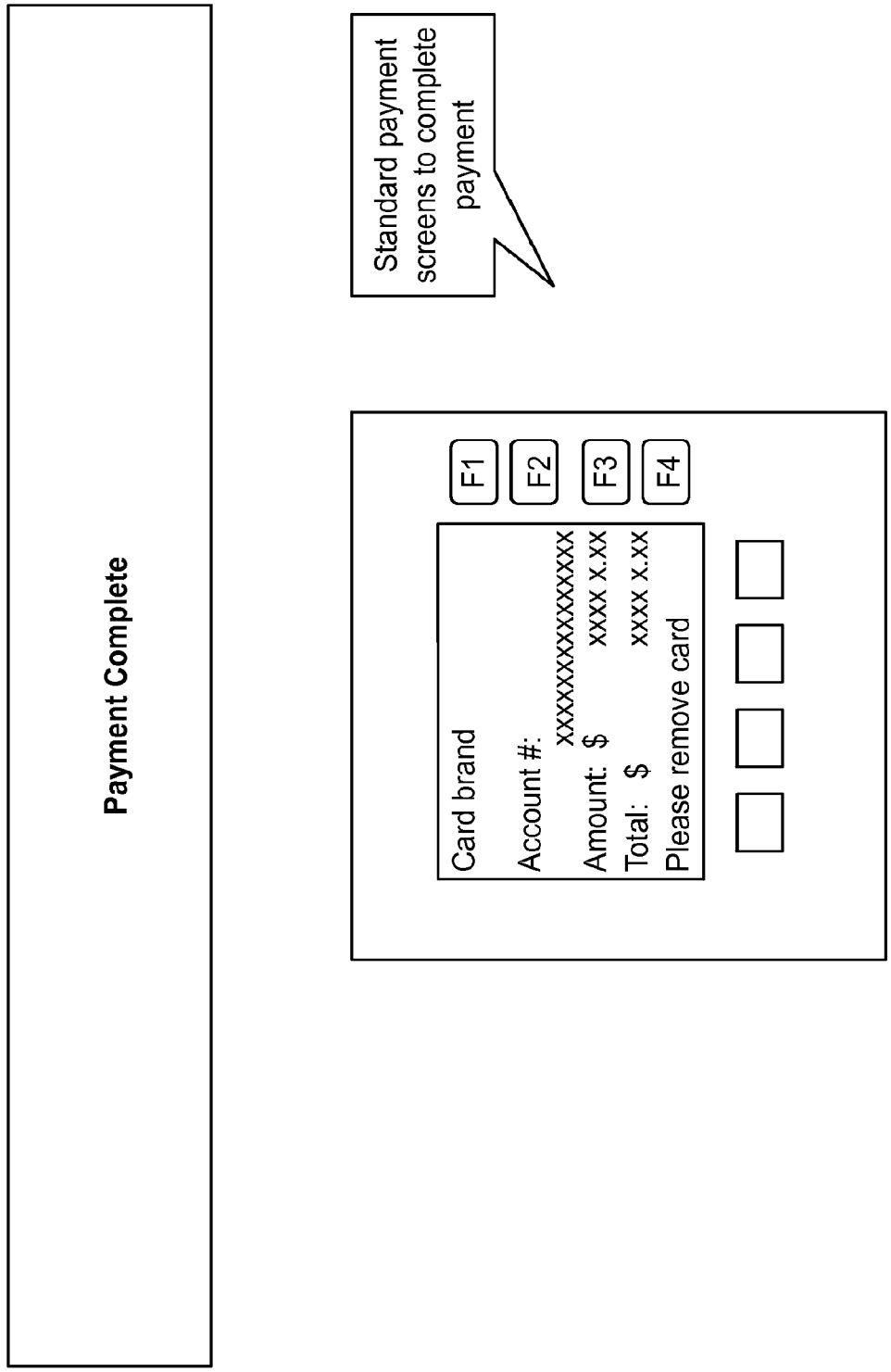

Referring to FIG. 13, once reward processing is concluded, the reward control application 18 passes control to a payment application (not shown) residing in the POS device 12. The payment application completes payment for the transaction. The payment progress is displayed by the POS device 12 as shown in FIGS. 14 and 15. It should be understood that the transaction payment process is commonly known in the industry and that a person of ordinary skill in the art will know of ways and/or methods to implement the payment application to achieve the payment process.

The following is a further illustration of the present invention. A smartcard-holder has a smartcard with a loyalty application and a payment application. The smartcard-holder is ready to perform a purchase transaction at merchant #1 which has a POS device that includes the reward control application 12 as described above. The smartcard-holder has made previous purchases at merchant #1 and has already earned a reward for a 15% purchase discount on a purchase of $25 dollars or more at merchant #1. The smartcard-holder makes a purchase today of $35 at merchant #1 and earns an instant reward of $5 off a purchase of $30 or more at merchant #1. The POS device is configured to sort the rewards on the basis of highest to lowest dollar amount earned and then display the sorted rewards and selection or deferral options to the smartcard-holder.

The smartcard-holder views the POS device display and the first reward displayed would be for a 15% discount which results in $5.25 off of the $35 purchase amount. The second reward displayed to the smartcard-holder would be for $5 off of the $35 purchase amount. The smartcard-holder would have the option to select to redeem one of the rewards or to defer the redemption of both of the earned rewards.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is the claimed is:

1. A method comprising:
   receiving, by a device, a selection of a reward option;
   receiving, by the device, a purchase amount for a purchase transaction;
   retrieving, by the device, loyalty program information from a loyalty program participant;
   identifying, by the device, rewards that are available for redemption based on the loyalty program information;
   sorting, by the device, the available rewards in a predetermined order; and
   providing, by the device, the rewards in the predetermined order.

2. The method of claim 1 wherein the predetermined order is based on one of corresponding expiration dates of the rewards or corresponding monetary values of the rewards.

3. The method of claim 2 wherein the predetermined order is based on corresponding expiration dates of the rewards if the monetary values corresponding to the rewards are equal.

4. The method of claim 1 wherein the method further comprises:
   updating the loyalty program information upon redemption of a selected reward.

5. The method of claim 1 wherein the loyalty program information is stored in a smartcard.

6. The method of claim 1 further comprising:
   displaying, by the device, a payment option.

7. The method of claim 1 wherein the loyalty program information is received from a smartcard used by the loyalty program participant, and wherein identifying rewards and displaying rewards occurs while the device is offline.

8. The method of claim 1 wherein the purchase amount is displayed on the device before any redeemable rewards are displayed.

9. The method of claim 1 further comprising:
   receiving selection information from the loyalty program participant regarding the displayed rewards; and
   processing the selection information to determine whether to effect immediate redemption of a selected reward or defer the rewards for subsequent redemption.

10. The method of claim 9 further comprising:
    allowing the loyalty program participant to scroll through the rewards.

11. The method of claim 9 wherein the selection information indicates that none of the displayed rewards was selected, and wherein the rewards are thereafter deferred.

12. The method of claim 1 wherein the method further comprises:
    displaying a plurality of options for selection by the loyalty program participant, wherein the plurality of options includes a sale option, a void option, and a refund option.

13. The method of claim 1 wherein providing, by the device, the rewards in a predetermined order comprises displaying the rewards in the predetermined order.

14. The method of claim 1 wherein the device is a POS terminal.

15. A method comprising:
    receiving, by a computer, transaction data from a device;
    sending, by the computer, to the device, one or more rewards that are available for redemption, wherein the one or more rewards are based on information related to a loyalty program and the transaction data, and wherein the rewards are sorted and displayed on the device in a predetermined order; and
    receiving, by the computer from the device, a reward selection selected by a loyalty program participant, the reward selection based upon the transaction data from the device, the reward selection including one of immediate redemption of the selected reward or deference of the selected reward for subsequent redemption.

16. The method of claim 15, wherein the computer and the device operate in conjunction with a payment processing network.

17. The method of claim 15, wherein the device is configured to function in cooperation with a smartcard.

18. The method of claim 15 wherein the device is a POS device.

19. The method of claim 15 wherein the method is performed by a merchant.

20. The method of claim 15 wherein the device previously interacted with a smartcard.

21. A device comprising:
    a processor; and a computer readable medium coupled to the processor, the computer readable medium comprising code, executable by the processor, to implement a method comprising receiving, by the device, a selection of a reward option, receiving, by the device, a purchase amount for a purchase transaction, retrieving, by the device, loyalty program information from a loyalty program participant, identifying, by the device, rewards that are available for redemption based on the loyalty program information, sorting, by the device, the available rewards in a predetermined order, and providing, by the device, the rewards in the predetermined order.

22. The device of claim 1 wherein the predetermined order is based on one of corresponding expiration dates of the rewards or corresponding monetary values of the rewards.

23. A computer comprising:

a processor; and a computer readable medium coupled to the processor, the computer readable medium comprising code, executable by the processor to implement a method comprising receiving, by the computer, transaction data from a device, sending, by the computer, to the device, one or more rewards that are available for redemption, wherein the one or more rewards are based on information related to a loyalty program and the transaction data, and wherein the rewards are sorted and displayed on the device in a predetermined order, and receiving, by the computer from the device, a reward selection selected by a loyalty program participant, the reward selection based upon the transaction data from the device, the reward selection including one of immediate redemption of the selected reward or deference of the selected reward for subsequent redemption.

24. The computer of claim 23, wherein the computer and the device operate in conjunction with a payment processing network.

25. A system comprising the computer of claim 23 and the device coupled to the computer.

* * * * *

UNITED STATES PATENT AND TRADEMARK OFFICE
CERTIFICATE OF CORRECTION

| | | |
|---|---|---|
| PATENT NO. | : 8,775,241 B2 | Page 1 of 1 |
| APPLICATION NO. | : 13/851723 | |
| DATED | : July 8, 2014 | |
| INVENTOR(S) | : Corinne Bortolin et al. | |

It is certified that error appears in the above-identified patent and that said Letters Patent is hereby corrected as shown below:

On The Title Page, item (72) Inventors:
Last Inventor: James G. Gordon, delete "Foster City, CA" and add --Eastwood (AU)--

Signed and Sealed this
Eighteenth Day of August, 2015

Michelle K. Lee
*Director of the United States Patent and Trademark Office*